Aug. 8, 1944.  A. C. JOHNSON  2,355,379
MULTIPLE PISTON ENGINE
Filed Feb. 1, 1943   5 Sheets-Sheet 1

INVENTOR
Alfred C. Johnson
BY
John A. Naismith
ATTY

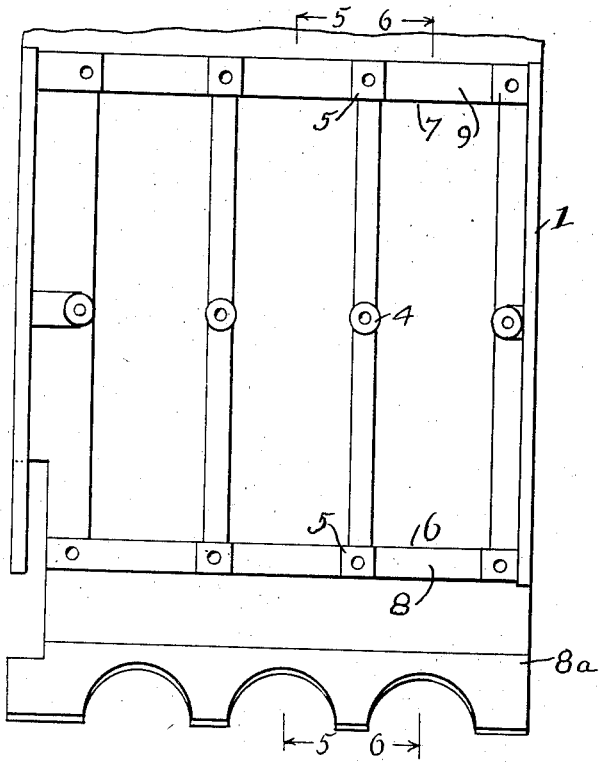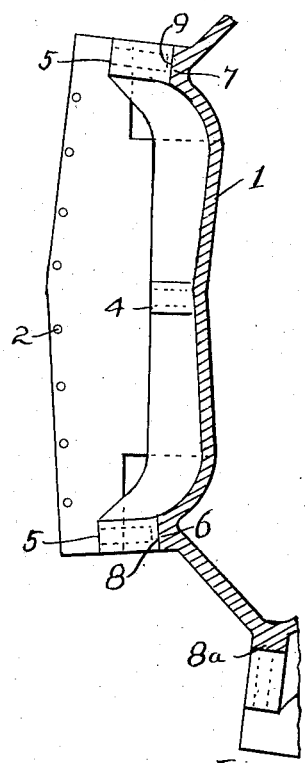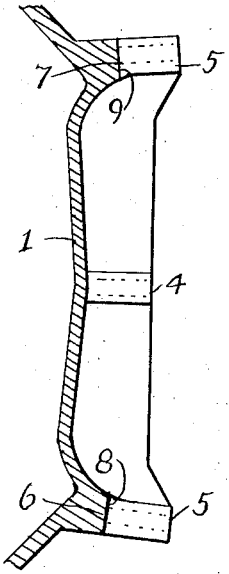

Aug. 8, 1944.   A. C. JOHNSON   2,355,379
MULTIPLE PISTON ENGINE
Filed Feb. 1, 1943   5 Sheets-Sheet 4

INVENTOR
Alfred C. Johnson
BY
John A. Naismith
ATTY

Patented Aug. 8, 1944

2,355,379

UNITED STATES PATENT OFFICE 2,355,379

MULTIPLE PISTON ENGINE

Alfred C. Johnson, Santa Clara, Calif.

Application February 1, 1943, Serial No. 474,395

3 Claims. (Cl. 123—51)

It is one object of the present invention to provide multiple piston engines that will be much more efficient in the production of power from low grade and cheap fuel than those engines heretofore known.

It is another object to provide an engine of the character indicated wherein two opposed pistons cooperate in the formation of a combustion chamber common to both of them and are timed to secure a more efficient inlet of air and exhaustion of burnt gases in the cylinder in which they operate. Still another object of the invention is to provide a smoother flow of power to the driven shaft than can be obtained with this type of engine as heretofore produced.

It is also an object of the invention to provide an engine of the character indicated wherein the weight per horsepower is reduced to the lowest practicable point, and one that is simple and economical in construction, that may be easily and quickly assembled, disassembled or repaired, and highly efficient in its practical application.

In the drawing:

Figure 4 is an outside elevation of one side of the engine block with part broken away.

Figure 5 is a sectional view of the engine block on line 5—5 of Figure 4.

Figure 6 is a sectional view on line 6—6, Figure 4.

Figure 1:
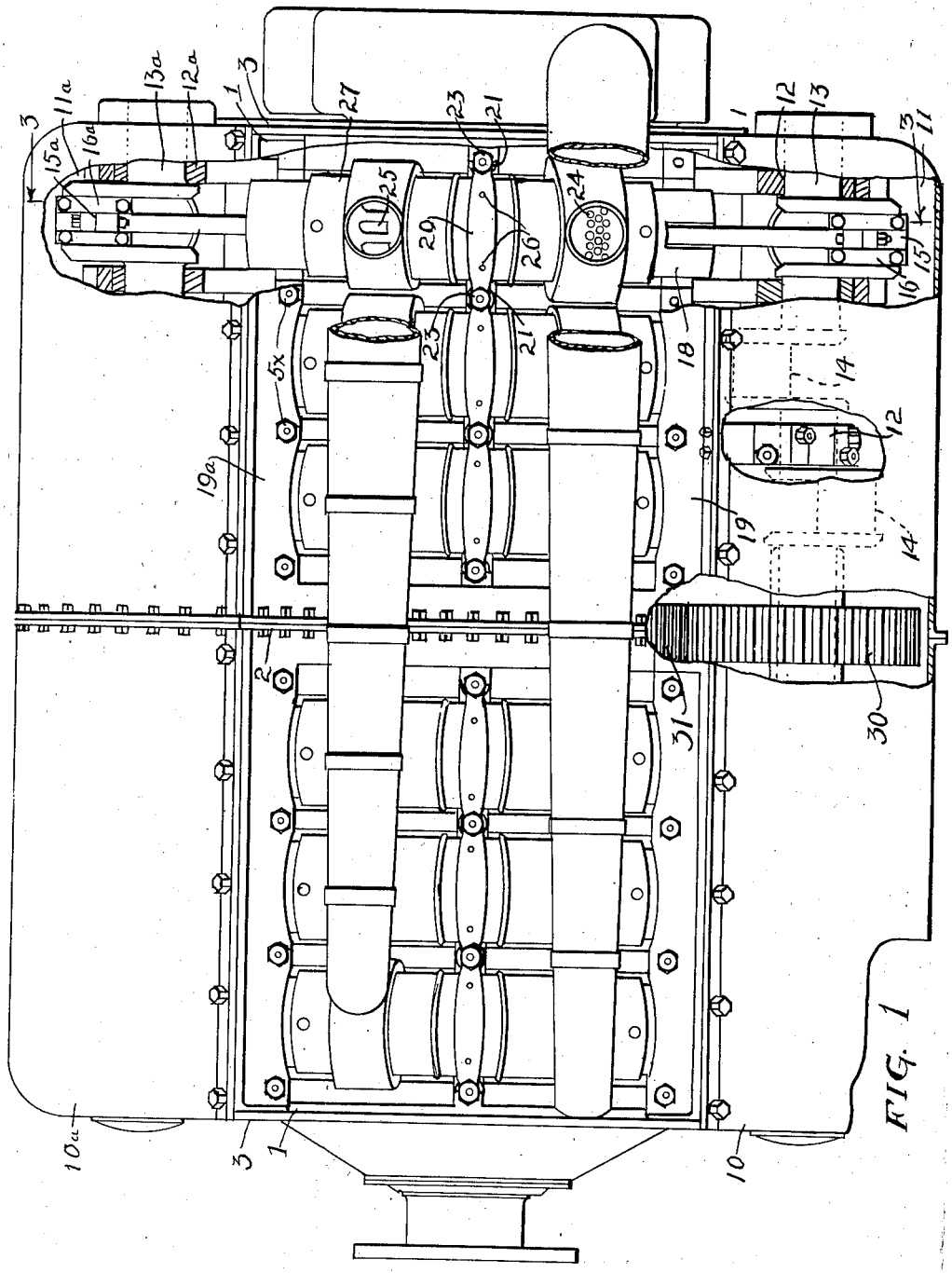
Figure 1 is a side elevation of an engine embodying my invention with parts broken away and partly in section.
Figure 2:
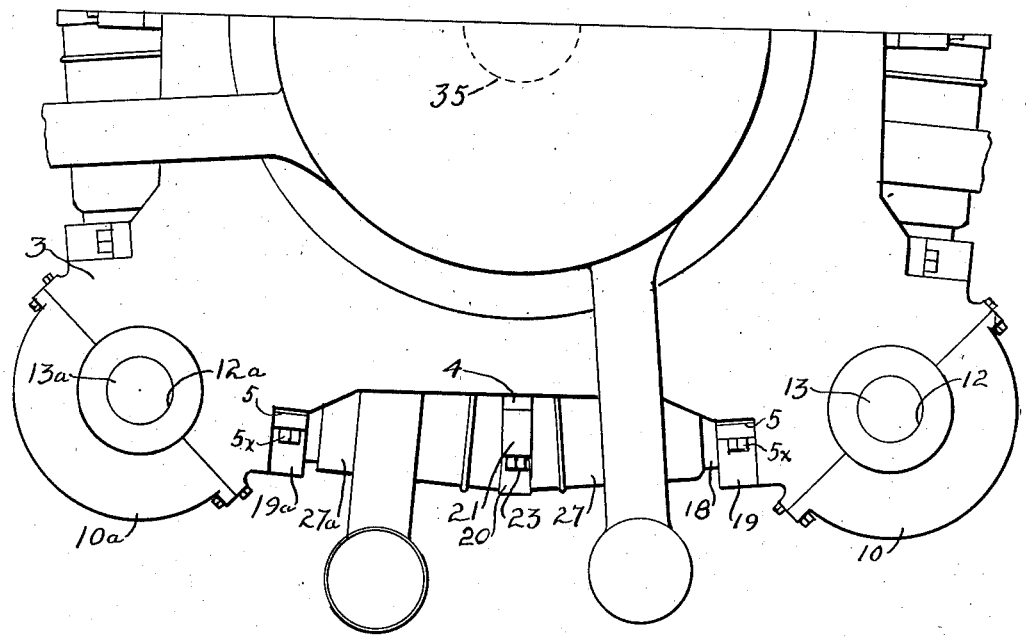
Figure 2 is an end view of one-half of the engine.
Figure 3:
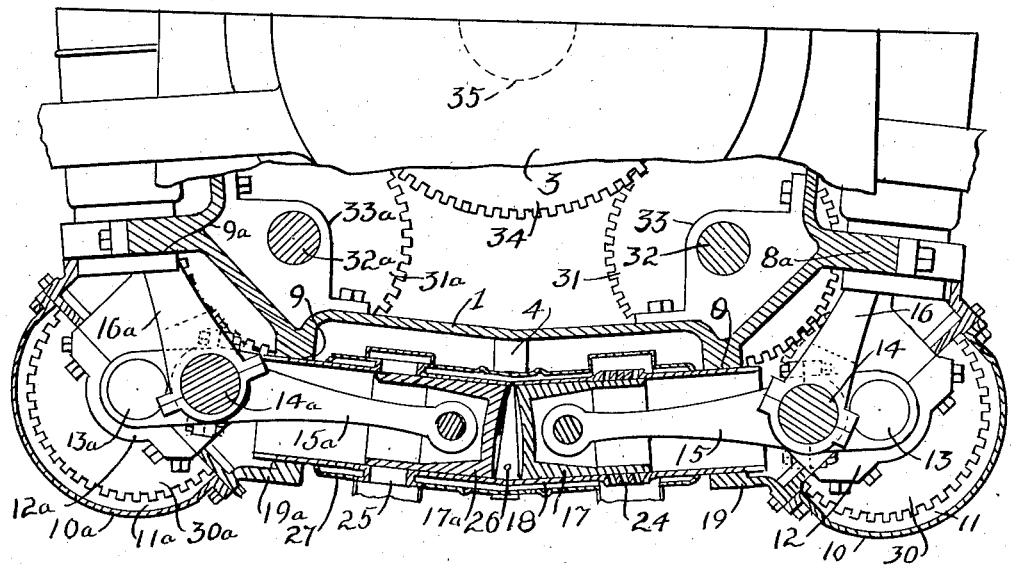
Figure 3 is an end view of one-half of the engine with parts broken away and with a part in section at 3—3 of Figure 1.
Figure 7:
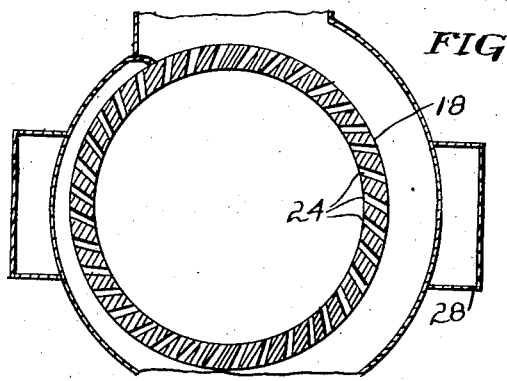
Figure 7 is an enlarged cross section through the cylinder structure at the point of air inlet, parts broken away.
Figure 9:
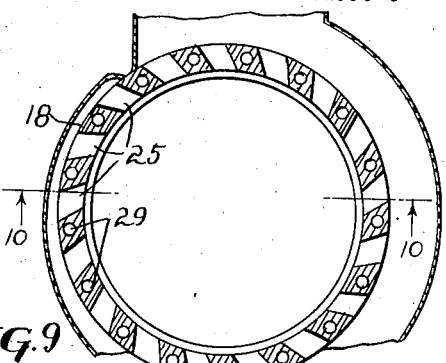
Figure 9 is an enlarged cross section through the cylinder structure at the point of the exhaust ports, parts being broken away.
Figure 8:
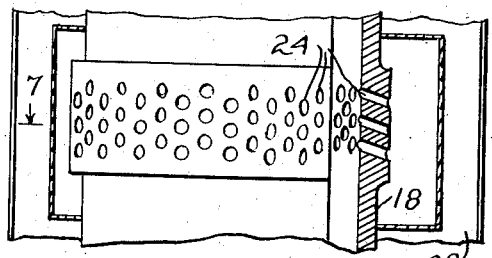
Figure 8 is an elevation of the same, parts being broken away.
Figure 10:
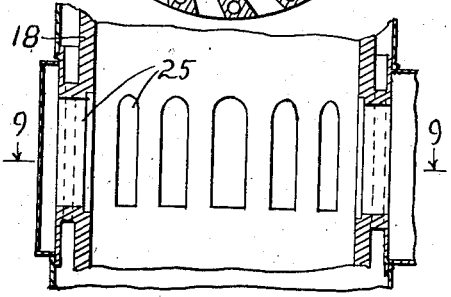
Figure 10 is a sectional view on line 10—10, Figure 9.
Figure 13:
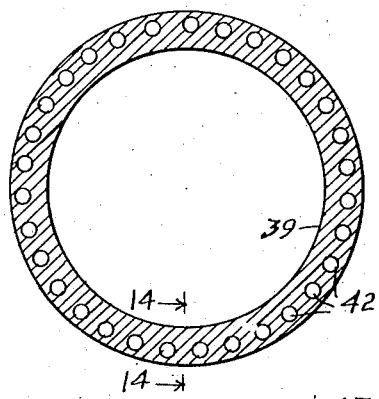
Figure 13 is an enlarged cross section through the center of a cylinder.
Figure 11:
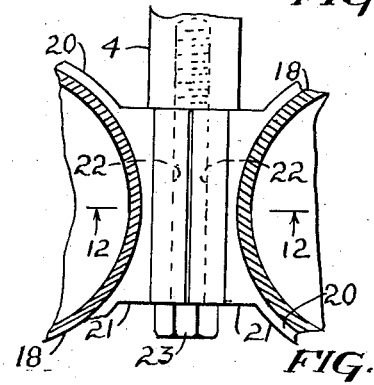
Figure 11 is an enlarged cross section through adjoining cylinders showing their mounting, parts broken away.
Figure 14:
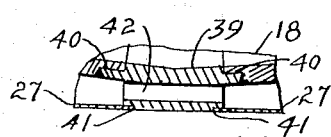
Figure 14 is a sectional view on line 14—14, Figure 13.
Figure 12:
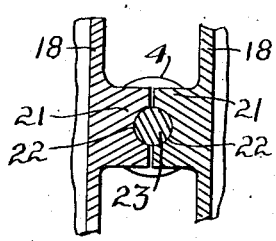
Figure 12 is a sectional view on line 12—12, Figure 11.
Figure 15:
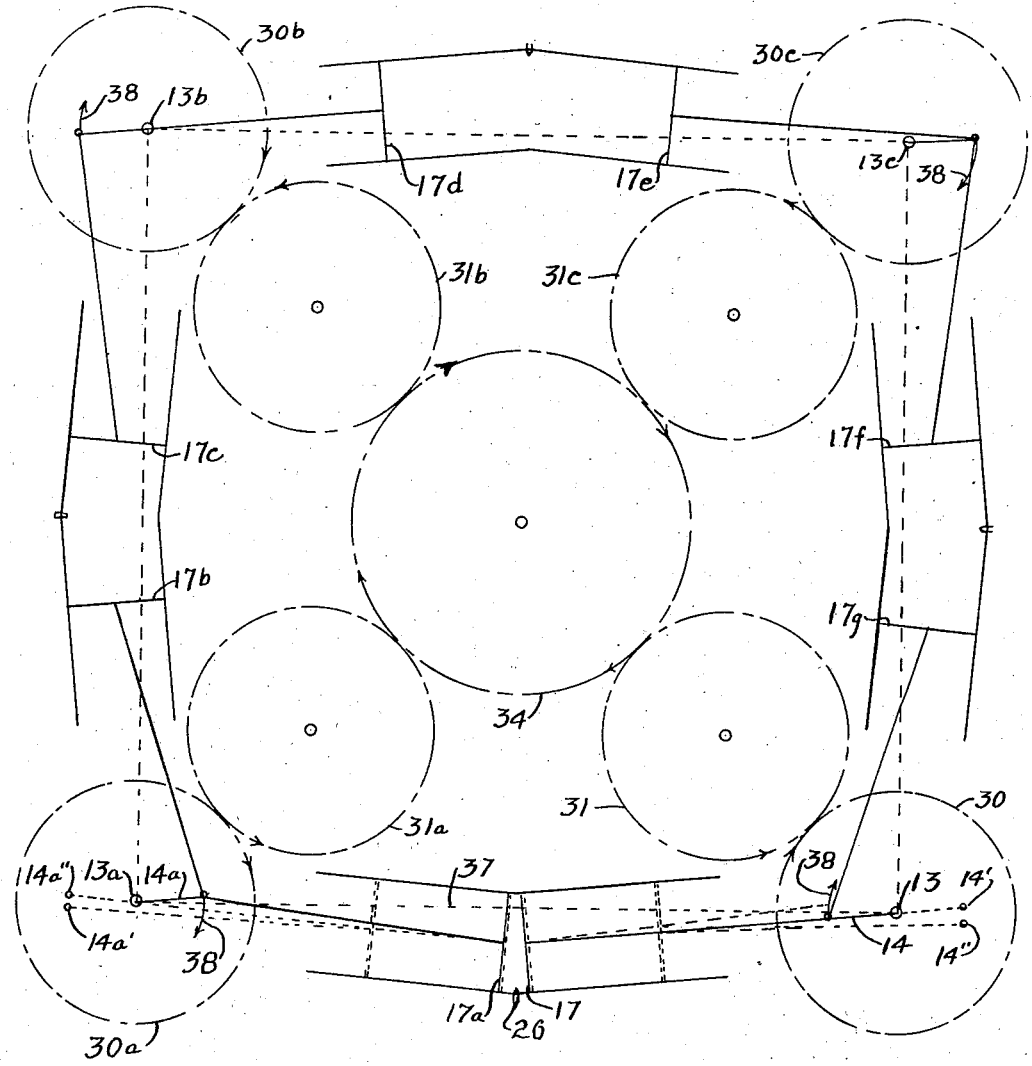
Figure 15 is a diagram showing the mode of operation of the engine.

The particular engine disclosed is built around a block comprising two symmetrically arranged identical castings as 1, and each casting is substantially rectangular in cross section and hollow as indicated by the partial section in Figure 5, the corners being formed at forty-five degrees to the sides. The inner ends of the two elements 1 are bolted together as at 2, and their outer ends are fitted with closures as 3. Each of the four sides of the member 1 is provided with bosses as 4 and 5 and top and bottom flanges 6 and 7 provided with curvilinear seats as 8 and 9 for the purpose hereinafter described. Each pair of adjoining corner flanges as 8—8a and 9—9a has a semi-circular trough shaped member with closed ends as 10—10a mounted thereon to complete housings for the several crank-shafts, and form chambers as 11 and 11a.

Mounted in suitable bearings as 12 in chamber 11 and extending from one end to the other of said chamber is a crank-shaft 13, and the structure here described is duplicated in each of the other corner chambers, the four crankshafts being located exactly at the four corners of a square and paralleling each other.

In the present instance each crank-shaft is provided with six cranks as 14, and each crank has two piston-rods as 15 and 16 mounted thereon, the one straddling the other as shown.

Each piston-rod, as 15, is connected to a piston 17, and the piston is reciprocated in a cylinder 18. The cylinder 18 in two parts is seated in the aligned curvilinear seats 8 and 9 in flanges 6 and 7, and is firmly and slidably held in place in the following manner. The ends are held in place by means of straps 19 secured to the bosses 4 and 5 by means of bolts 5x, and the center is fixedly secured by means of a part 39 which terminates on both sides of the cylinder in a member 21 provided with a tangentially disposed groove 22. Two adjacent cylinders are placed in position on seats 8—9 and with members 21 seated on a boss 4 after which bolts 23 are screwed into position and the cylinders are secured fixedly and firmly in place.

The cylinder 18 consists of two halves with their open ends directed toward a crank-shaft as 13 and 13a, the longitudinal axis of the cylinder forming an obtuse angle with a straight line joining the centers of the two crankshafts. In other words, the longitudinal axis of each half of the cylinder forms an acute angle with said straight line, in the present instance lying at an angle of five degrees relative thereto.

The cylinder 18 is provided with air inlet ports at 24 and exhaust ports at 25 inclined toward the center of the cylinder and tangentially relative thereto, and in an opposite direction relative to each other so that air entering the ports 24 in one direction will exhaust with burnt gases while flowing in the same direction. The fuel injector points are indicated at 26, and the water jackets are indicated at 27. Water circulation past the intake ports 24 is provided by by-pass 28 and past the exhaust ports 25 by passages 29. The outside connections of the water jackets and the injector points are not shown.

On the center of each crank-shaft is mounted a gear 30, and this gear meshes with a similar gear 31 mounted on a shaft 32 in bearing 33 on block 1. Each gear 31 meshes with a central gear 34 on driven shaft 35 mounted in bearings as 36 and extending axially relative to the several banks of engines.

By means of this method of construction all of the working parts except the gears and their supports are located exteriorly of the engine block and are readily accessible. Furthermore, the angular form of the double cylinder results in the formation of a combustion chamber, when the two pistons are furthest advanced, that is wedge-shaped from front to rear so that when compression takes place and the fuel is injected the turbulence effected by the angular entrance of the air is maintained, or probably increased, with a resulting perfect mixing of the air and fuel.

In the diagram 37 indicates a straight line joining the centers of the two crank-shafts 13 and 13a and the crank 14 is at top dead center before it reaches the line 37, all of the cranks turning in the direction indicated by the arrows 38. The crank 14a at this moment is in the position shown just before it reaches the line 37 so that when it passes the line 37 to its top dead center and advances the face of its piston 17a to the position indicated by the dotted line the crank 14, moving exactly the same distance in the same time has also passed the line 37 and drawn the face of the piston 17 back to the position indicated by the dotted line. The same overlapping of the strokes of the two pistons also takes place at the other end of their strokes; that is, while the crank 14 moves low dead center at 14' to 14" and correspondingly advances the face of its piston as indicated in dotted lines the crank 14a moves from 14a' to bottom dead center 14a" and withdraws the face of its piston as indicated in dotted lines. This action means that piston 17 moves to compression slightly in advance of piston 17a and consequently effects a more perfect scavenging of burnt gases before the admission of air than otherwise would be the case, and its slight advance over piston 17a on expansion permits a slightly earlier discharge of burnt gases before the admission of air.

When the pistons 17 and 17a are in the positions shown in solid lines in the diagram, the pistons 17b, 17c, 17d, 17e, 17f and 17g are in the positions shown, pistons 17b and 17c, 17d and 17e, 17f and 17g, all working in pairs in the same identical manner as pistons 17 and 17a, the power from all of them being transmitted to the central shaft 35. This set of four crank-shafts and their connections are referred to as one bank, and with an assembly of six banks a practically continuous and smooth flow of power is applied to the driven shaft.

The central portion of the cylinder 18 is a separate element shown at 39 and fitted to the cylinder end portions as shown at 40, but enlarged to form seats as 41 for the water jackets 27 and having water passages 42 formed therethrough.

Having thus described my invention, what I claim as new and desire to secure by Letters Patent, is:

1. An engine comprising, a block having parallel cylinders disposed thereon and provided with a boss between each two cylinders, adjoining cylinders being provided with opposed elements formed with registering grooves and disposed to seat on the intervening boss, and means engaging said grooves and boss to fixedly hold the cylinders in position.

2. An engine comprising, a block having parallel cylinders disposed thereon and provided with a boss between each two cylinders, adjoining cylinders being provided with opposed elements formed with registering grooves and disposed to seat on the intervening boss, means engaging said grooves and boss to fixedly hold the cylinders in position, and means operatively disposed on the block to slidably support the ends of the cylinders.

3. An engine comprising, a supporting block having parallel cylinders open at both ends and having central explosion chambers mounted thereon, means operative to rigidly support the central portion of each cylinder, and means operative to slidably support the two ends of each cylinder.

ALFRED C. JOHNSON.